US011948491B2

(12) United States Patent
Li

(10) Patent No.: US 11,948,491 B2
(45) Date of Patent: Apr. 2, 2024

(54) GRAYSCALE CONTROLLING METHOD AND DISPLAY PANEL

(71) Applicant: TCL CHINA STAR OPTOELECTRONICS TECHNOLOGY CO., LTD., Shenzhen (CN)

(72) Inventor: Wenfang Li, Shenzhen (CN)

(73) Assignee: TCL CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 338 days.

(21) Appl. No.: 17/426,487

(22) PCT Filed: Jun. 8, 2021

(86) PCT No.: PCT/CN2021/098947
§ 371 (c)(1),
(2) Date: Jul. 28, 2021

(87) PCT Pub. No.: WO2022/217730
PCT Pub. Date: Oct. 20, 2022

(65) Prior Publication Data

US 2023/0343266 A1 Oct. 26, 2023

(30) Foreign Application Priority Data

Apr. 16, 2021 (CN) ......................... 202110413604.9

(51) Int. Cl.
*G09G 3/20* (2006.01)
*G09G 3/32* (2016.01)
*G09G 3/34* (2006.01)

(52) U.S. Cl.
CPC ......... *G09G 3/2007* (2013.01); *G09G 3/3406* (2013.01); *G09G 3/32* (2013.01); *G09G 2320/0233* (2013.01); *G09G 2360/16* (2013.01)

(58) Field of Classification Search
CPC ...... G09G 3/3406; G09G 1/1336; G09G 3/32; G09G 3/2007; G09G 2320/0233; G09G 2360/16
See application file for complete search history.

(56) References Cited

U.S. PATENT DOCUMENTS

2007/0152641 A1* 7/2007 Kusafuka ............ F02N 11/0862 322/28
2009/0243496 A1 10/2009 Lee et al.
(Continued)

FOREIGN PATENT DOCUMENTS

CN 1822084 A 8/2006
CN 103413539 A 11/2013
(Continued)

*Primary Examiner* — Kevin M Nguyen
(74) *Attorney, Agent, or Firm* — The Roy Gross Law Firm, LLC; Roy Gross

(57) ABSTRACT

The present invention provides a grayscale controlling method and a display panel applied to the display panel including a backlight unit. The grayscale controlling method includes: in a frame time, acquiring a duration of a current driving current output to the backlight unit exceeding a predetermined current value, and then adjusting a grayscale value of the backlight unit as a target grayscale value.

17 Claims, 6 Drawing Sheets

(56) References Cited

U.S. PATENT DOCUMENTS

| | | | | |
|---|---|---|---|---|
| 2014/0176014 | A1* | 6/2014 | Hu | G09G 3/3426 315/307 |
| 2014/0184185 | A1* | 7/2014 | Torrisi | H02H 9/002 323/277 |
| 2018/0180941 | A1* | 6/2018 | Zhang | G09G 3/3406 |
| 2018/0254014 | A1 | 9/2018 | Li | |

FOREIGN PATENT DOCUMENTS

| | | | |
|---|---|---|---|
| CN | 105590588 | A | 5/2016 |
| CN | 108766366 | A | 11/2018 |
| CN | 112216237 | A | 1/2021 |
| CN | 112530363 | A | 3/2021 |
| JP | H08228026 | A | 9/1996 |
| JP | 2008064886 | A | 3/2008 |
| KR | 20080088066 | A | 10/2008 |

* cited by examiner

GRAYSCALE CONTROLLING METHOD AND DISPLAY PANEL

CROSS REFERENCE TO RELATED APPLICATIONS

This application is a National Phase of PCT Patent Application No. PCT/CN2021/098947 having International filing date of Jun. 8, 2021, which claims the benefit of priority Chinese Application No. 202110413604.9, filed on Apr. 16, 2021. The contents of the above applications are all incorporated by reference as if fully set forth herein in their entirety.

FIELD OF INVENTION

The present invention relates to a field of communication technologies, especially to a grayscale controlling method and a display panel.

BACKGROUND OF INVENTION

Because mini-LED lamp beads have characteristics of long life, high brightness, low power consumption, small size, and super high resolution, the mini-LED lamp beads have been widely used in backlight modules of display panels.

However, under conventional technologies, constant voltage is usually used to drive the mini-LED lamp beads. When the mini-LED lamp beads are used continuously for a long time, an internal driving current will be excessively large due to heat, which results in a working power exceeding specification.

SUMMARY OF INVENTION

Technical Issue

The present invention provides a grayscale controlling method and display panel, which effectively solves the issue that a constant voltage is used to drive a backlight unit and causes it to generate excessive driving current due to heat after a long time of work to further results in an excessive working power.

Technical Solution

In an aspect, the present invention provides a grayscale controlling method applied to a display panel including a backlight unit, and the grayscale controlling method comprises:

in a frame time, acquiring a duration of a current driving current output to the backlight unit exceeding a predetermined current value; and adjusting a grayscale value of the backlight unit as a target grayscale value according to the duration.

Further optionally, the step of acquiring a duration of a current driving current output to the backlight unit exceeding a predetermined current value, specifically comprises:

outputting a warning signal when the current driving current output to the backlight unit exceeds the predetermined current value; and determining a sum of time lengths of the warning signal appearing in the frame time as the duration of the current driving current exceeding the predetermined current value.

Further optionally, the frame time comprises a plurality of sub-fields, the warning signal appears in adjacent ones of the sub-fields, and/or the warning signal appears in non-adjacent ones of the sub-fields.

Further optionally, time lengths of the sub-fields are equal, and/or the time lengths of the sub-fields are unequal.

Further optionally, when the time lengths of the sub-fields are unequal, the step of determining the sum of the time lengths of the warning signal appearing in the frame time as the duration of the current driving current exceeding the predetermined current value, specifically comprises:

determining the sub-fields of the warning signal appearing in the frame time as target sub-fields; and performing a weighted calculation according to a predetermined formula and the time lengths of the target sub-fields to determine the duration of the current driving current exceeding the predetermined current value.

Further optionally, the step of adjusting the grayscale value of the backlight unit as the target grayscale value according to the duration, specifically comprises:

acquiring a grayscale value look-up table when the duration exceeds a predetermined time, wherein the grayscale value look-up table comprises a plurality of calibration durations and a plurality of grayscale value mapping messages; and determining the grayscale value corresponding to the duration as the target grayscale value according to the grayscale value look-up table.

Further optionally, after the step of adjusting the grayscale value of the backlight unit as the target grayscale value according to the duration, the method further comprises:

determining a target driving current output to the backlight unit according to the target grayscale value.

Further optionally, after the step of determining a target driving current output to the backlight unit according to the target grayscale value, the method further comprises:

outputting a reset signal; and returning to and implementing the step of in the frame time, acquiring the duration of a current driving current output to the backlight unit exceeding the predetermined current value according to the reset signal.

In another aspect, the present invention further provides a display panel, and the display panel comprises:

a backlight unit;

at least one driver circuit electrically connected to the backlight unit and configured to drive the backlight unit; and a grayscale output module electrically connected to the driver circuit and configured to determine a target grayscale value provided to the driver circuit, wherein the target grayscale value is required for driving the backlight unit to light according to a duration of a current driving current output to the backlight unit exceeding a predetermined current value.

Further optionally, the display panel further comprises a detection unit, and the detection unit is configured to output a warning signal to the grayscale output module when the current driving current exceeds the predetermined current value such that the grayscale output module determines a sum of time lengths of the warning signal appearing in a frame time as the duration.

Further optionally, the frame time comprises a plurality of sub-fields, the warning signal appears in adjacent ones of the sub-fields, and/or the warning signal appears in non-adjacent ones of the sub-fields.

Further optionally, time lengths of the sub-fields are equal, and/or the time lengths of the sub-fields are unequal.

Further optionally, when the time lengths of the sub-fields are unequal, the detection unit is configured to determine the sub-fields of the warning signal appearing in the frame time as target sub-fields and implement a weighted calculation according to a predetermined formula and the time lengths of the target sub-fields to determine the duration of the current driving current exceeding the predetermined current value.

Further optionally, the grayscale output module is further configured to output a reset signal to the detection unit after the frame time ends such that the detection unit stops outputting the warning signal.

Further optionally, a detection resistor is disposed on the driver circuit, the detection unit is electrically connected to two ends of the detection resistor, and the detection unit determines the current driving current according to a resistance value of the detection resistor and voltages at the two ends of the detection resistor.

Further optionally, the grayscale output module further comprises a power supply unit, the power supply unit is configured to supply power to the detection unit.

In another aspect, the present invention further provides a mobile terminal, and the mobile terminal comprises a display panel, and the display panel comprises:

a backlight unit;

at least one driver circuit electrically connected to the backlight unit and configured to drive the backlight unit; and a grayscale output module electrically connected to the driver circuit and configured to determine a target grayscale value, which is provided to the driver circuit, required for driving the backlight unit to light according to a duration of a current driving current output to the backlight unit exceeding a predetermined current value.

Further optionally, the display panel further comprises a detection unit, and the detection unit is configured to output a warning signal to the grayscale output module when the current driving current exceeds the predetermined current value such that the grayscale output module determines a sum of time lengths of the warning signal appearing in a frame time as the duration.

Further optionally, the frame time comprises a plurality of sub-fields, the warning signal appears in adjacent ones of the sub-fields, and/or the warning signal appears in non-adjacent ones of the sub-fields.

Further optionally, time lengths of the sub-fields are equal, and/or the time lengths of the sub-fields are unequal.

Advantages

The present invention provides a grayscale controlling method, applied to a display panel comprising a backlight unit, and the grayscale controlling method comprises: in a frame time, acquiring a duration of a current driving current output to the backlight unit exceeding a predetermined current value, and then, adjusting a grayscale value of the backlight unit as a target grayscale value according to the duration. The grayscale controlling method provided by the present invention, by adjusting the grayscale value of the backlight unit as the target grayscale value according to the duration of the current driving current in the backlight unit in the current frame exceeding the predetermined current value, adjusts the driving current of the backlight unit emitting light in a next frame, which effectively prevents the working power of the backlight unit from exceeding specification.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

Figure 1:
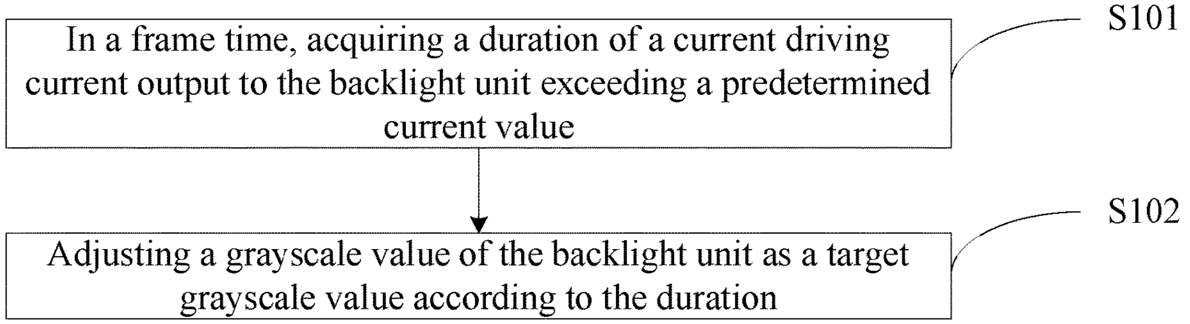
FIG. 1 is a schematic flowchart of a grayscale controlling method provided by an embodiment according to the present invention.

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

In the description of the present application, it should be understood that terminologies "center", "longitudinal", "transverse", "length", "width", "thickness", "upper", "lower", "front", "rear", "left", "side", "vertical", "horizontal", "top", "bottom", "inner", "outer", "clockwise", "counterclockwise" for indicating relations of orientation or position are based on orientation or position of the accompanying drawings, are only for the purposes of facilitating description of the present application and simplifying the description instead of indicating or implying that the referred device or element must have a specific orientation or position, must to be structured and operated with the specific orientation or position. Therefore, they should not be understood as limitations to the present application. Furthermore, terminologies "first", "second" are only for the purposes of description, and cannot be understood as indication or implication of comparative importance or a number of technical features. Therefore, a feature limited with "first", "second" can expressly or implicitly include one or more features. In the description of the present application, a meaning of "a plurality of" is two or more, unless there is a clear and specific limitation otherwise.

In the description of the present application, it should be noted that unless clear rules and limitations otherwise exist, terminologies "install", "connect", "connection" should be understood in a broad sense. For instance, the connection can be a fixed connection, a detachable connection or an integral connection. The connection can be a mechanical connection, an electrical connection or a telecommunication. The connection can be a direct connection, an indirect connection through an intermedium, can be an internal communication between two elements or an interaction between the two elements. For a person of ordinary skill in the art, the specific meaning of the above terminology in the present application can be understood on a case-by-case basis.

In the present application, it should be noted that unless clear rules and limitations otherwise exist, words "a first feature is "on" or "under" a second feature" can include a direct contact of the first and second features, can also include a contact of the first and second features through another feature therebetween instead of a direct contact. Furthermore, words "the first feature is "above" or "over" the second feature include that the first feature is right above or obliquely above the second feature, or only indicate that a level of the first feature is higher that of the second feature. Words "the first feature is "under" or "below" the second feature include that the first feature is right under or obliquely under the second feature, or only indicate that the level of the first feature is lower than that of the second feature.

The following disclosure provides many different embodiments or examples to achieve different structures of the present application. To simplify the disclosure of the present application, the components and arrangements of the specific examples are described below. Of course, they are merely examples, and the purpose is not to limit the present application. Furthermore, the present application may repeat reference numerals and/or reference letters in different examples. The repetition is for the purpose of simplification and clarity, and does not by itself indicate the relationship between the various embodiments and/or settings discussed. In addition, the present application provides examples of various specific processes and materials, but a person of ordinary skill in the art can be aware of the application of other processes and/or the use of other materials.

The present invention aims at an issue that a backlight unit in the conventional display panel driven by a constant voltage, after working for a long time, generates an excessive driving current due to heat to further result in a working power of the backlight unit exceeding specification. An embodiment according to the present invention is configured to solve the issue.

To solve the above issue, the present invention provides a grayscale controlling method, with reference to FIG. 1, FIG. 1 is a schematic flowchart of a grayscale controlling method provided by an embodiment according to the present invention. The grayscale controlling method is applied to a display panel comprising a backlight unit. Specific processes of the grayscale controlling method provided by the embodiment according to the present invention can be as follow:

An acquisition step S101: in a frame time, acquiring a duration of a current driving current output to the backlight unit exceeding a predetermined current value.

It is easily understood that as the working time of the backlight unit increases, driving current inside the backlight unit increases due to the heating of the backlight unit. When a time of the current driving current in the backlight unit exceeding the predetermined current value is too long, a working power of the backlight unit would exceed specification to further result in overly bright images displayed by the display panel.

It should be explained that in the present embodiment, a warning can be sent to a system after the above current driving current exceeds the predetermined current value. Then, the above duration is acquired according to the warning message.

Figure 2:
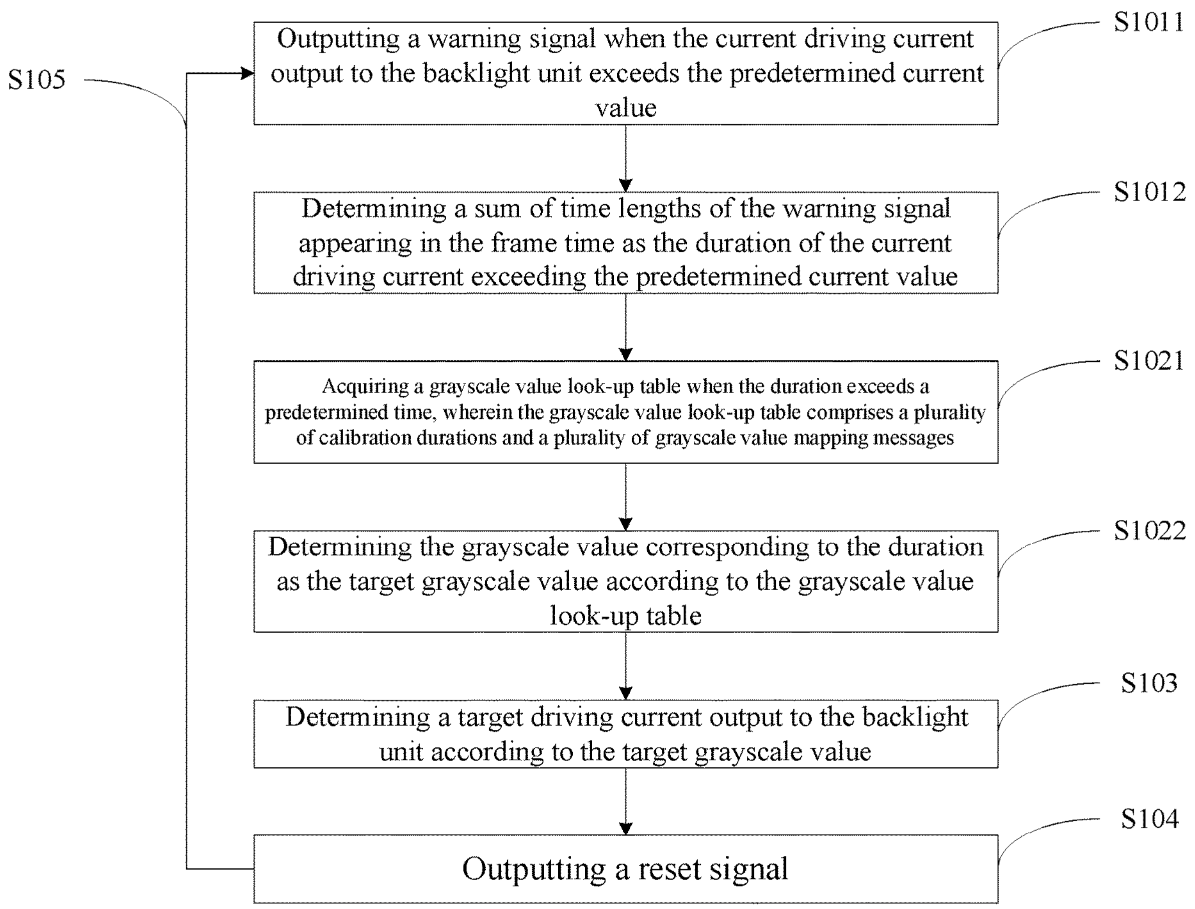
FIG. 2 is a further schematic flowchart of the grayscale controlling method provided by the embodiment according to the present invention.

For example, with reference to FIG. 2, FIG. 2 is a further schematic flowchart of the grayscale controlling method provided by the embodiment according to the present invention. The above acquisition step S101 can specifically comprise steps as follows:

A warning signal output step S1011 comprises: outputting a warning signal when the current driving current output to the backlight unit exceeds the predetermined current value.

A duration determination step S1012 comprises: determining a sum of time lengths of the warning signal appearing in the frame time as the duration of the current driving current exceeding the predetermined current value.

It is easily understood that in the present embodiment, when the above current driving current does not exceed the predetermined current value, the system outputs a high level shut-off signal. When the above current driving current exceeds the predetermined current value, the high level shut-off signal jumps to a low level warning signal. In other embodiment formed from the present invention, the warning signal can also be a high level signal. Namely, in the variant, the shut-off signal is a low level signal.

It should be explained that generally, a frame would be divided into several sub-fields with equal time lengths, the above warning signal can appear continuously in the adjacent sub-fields, and can also appear intermittently in the sub-fields not adjacent to each other. By calculating a sum of the sub-fields where the warning signal appears, the duration can be acquired. Besides, in some possible variants, a frame is also divided into several sub-fields with unequal time lengths. At this time, because weights of times occupied by the sub-fields occupying in a frame are unequal, performing a weighted calculation according to a predetermined formula is required to acquire the duration when the sum of the sub-fields where the warning signal appears.

Furthermore, the method of acquiring the above duration can also be that the system records times respectively when the above current driving current exceeds the predetermined current value and when the above current driving current decreases to be lower than the predetermined current value, and finally a duration is calculated by calculating a difference between the times. Besides, the system can also use all remaining time of the current frame as a duration after the above current driving current exceeds the predetermined current value.

An adjustment step S102 comprises: adjusting a grayscale value of the backlight unit as a target grayscale value according to the duration.

It is easily understood that compared to the grayscale value corresponding to the current driving current, the target grayscale value is smaller. After the grayscale value of the backlight unit is adjusted as the target grayscale value, the driving current in the backlight unit can be reduced to prevent the backlight unit from having the power exceed specification when lighting in a next frame.

It should be explained that a grayscale value look-up table recording a plurality of calibration durations and a plurality of grayscale value mapping messages can be stored in the system in advance. When the above adjustment step S102 is implemented, the grayscale value of the backlight unit is adjusted by calling the grayscale value look-up table.

For example, with further reference to FIG. 2, the above adjustment step S102 can specifically comprise steps as follows:

A grayscale value look-up table acquisition step S1021 comprises: acquiring a grayscale value look-up table when the duration exceeds a predetermined time, wherein the grayscale value look-up table comprises a plurality of calibration durations and a plurality of grayscale value mapping messages.

A target grayscale value determination step S1022 comprises: determining the grayscale value corresponding to the duration as the target grayscale value according to the grayscale value look-up table.

It is easily understood that the calibration durations stored by the grayscale look-up table and the grayscale value mapping messages can be one calibration duration corresponding to one grayscale value, and can be one calibration duration section corresponding to one grayscale value.

Furthermore, a method of determining whether the above duration exceeds the predetermined time can be determining whether a sum of sub-fields where the above warning signal appears exceeds a predetermined number, and if yes, determining that the duration exceeds the predetermined time.

It should be explained that after the grayscale value of the backlight unit is adjusted as a target grayscale value, it is also required to determine a driving current required for the backlight unit to light in the next frame according to the target grayscale value.

For example, with further reference to FIG. 2, after the target grayscale value determination step S1022, the method further comprises:

The target driving current determination step S103: determining a target driving current output to the backlight unit according to the target grayscale value.

It is easily understood that different grayscale values correspond to different driving currents, and when the current value output by the system is constant, the driving current output to the backlight unit can be adjusted by adjusting a duty ratio of the electrical signal output to the backlight unit.

Furthermore, with further reference to FIG. 2, after the step S103 of the above target driving current determination, the method further comprises steps as follows:

A reset signal output step S104: outputting a reset signal.

A return and implementation step S105: returning and implementing the step of in a frame time, acquiring a duration of a current driving current output to the backlight unit exceeding a predetermined current value according to the reset signal.

It is easily understood that the above low level warning signal jumps to a high level shut-off signal after the reset signal is output, and the high level shut-off signal only jumps low level warning signal again after the current driving current of the backlight unit of a next frame exceeds the predetermined current value.

Distinguished from the conventional technologies, the present invention provides a grayscale controlling method comprising: in a frame time, acquiring a duration of a current driving current output to the backlight unit exceeding a predetermined current value, and then, adjusting a grayscale value of the backlight unit as a target grayscale value according to the duration. The grayscale controlling method provided by the present invention, by adjusting the grayscale value of the backlight unit as the target grayscale value according to the duration of the current driving current in the backlight unit in the current frame exceeding the predetermined current value, adjusts the driving current of the backlight unit emitting light in a next frame, which effectively prevents the working power of the backlight unit from exceeding specification.

Figure 3:
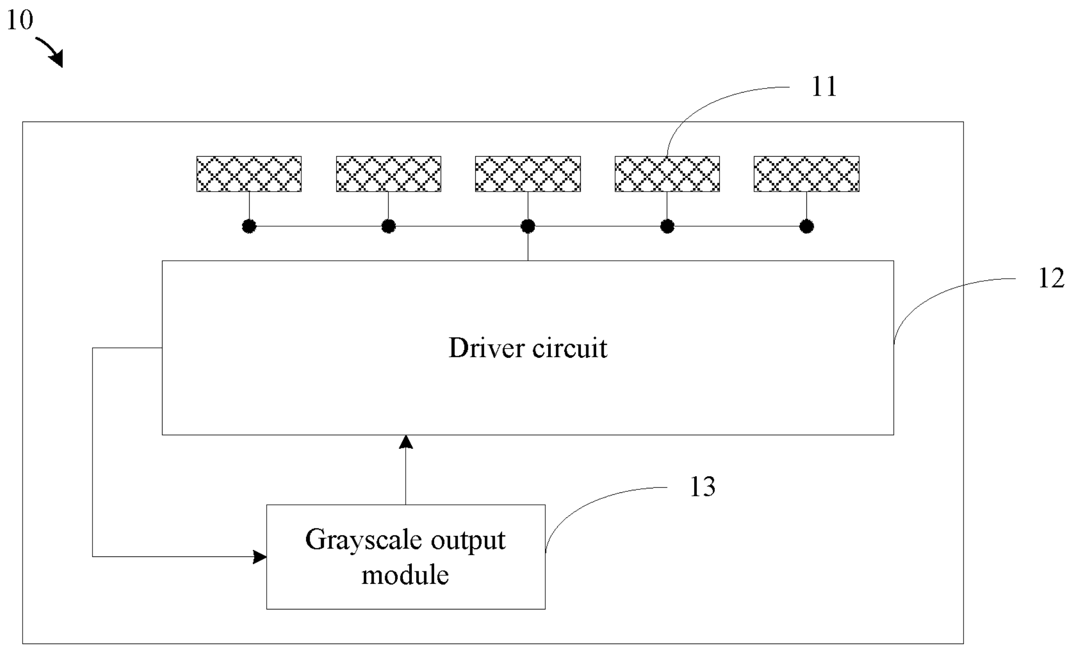
FIG. 3 is a schematic structural view of a display panel provided by an embodiment according to the present invention.

With reference to FIG. 3, FIG. 3 is a schematic structural view of a display panel 10 provided by an embodiment according to the present invention. The above grayscale controlling method is applied to the display panel 10. From FIG. 3, it is intuitive to see various components of an embodiment according to the present invention, and a relative positional relationship of each component.

With reference to FIG. 3, the display panel 10 comprises a backlight unit 11, a driver circuit 12, and a grayscale output module 13.

The driver circuit 12 is electrically connected to the backlight unit 11 and is configured to drive the backlight unit 11.

The grayscale output module 13 is electrically connected to the driver circuit 12, and is configured to determine a target grayscale value provided to the driver circuit 12, wherein the target grayscale value is required for driving the backlight unit 11 to light according to a duration of a current driving current output to the backlight unit 11 exceeding a predetermined current value.

It is easily understood that compared to the grayscale value corresponding to the current driving current, the target grayscale value is smaller, and after the grayscale value of the backlight unit 11 is adjusted as a target grayscale value, the driving current inside the backlight unit 11 can be reduced to prevent the backlight unit 11 from having the power exceed specification when lighting in a next frame.

Figure 4:
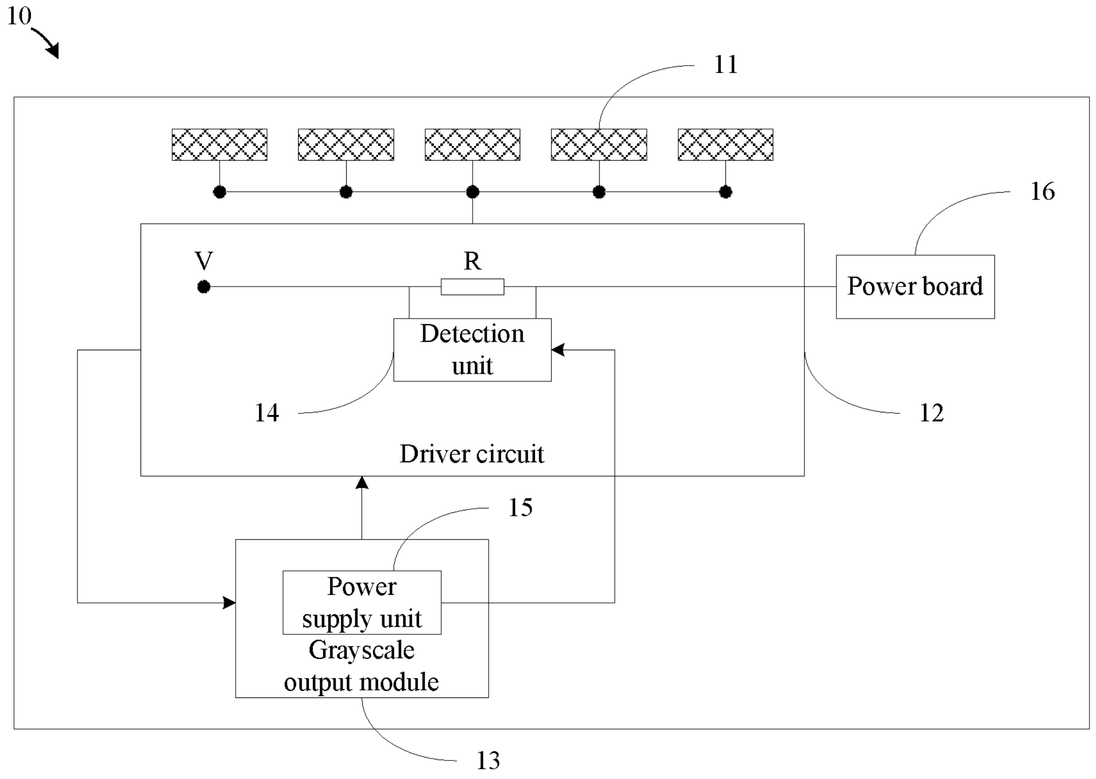
FIG. 4 is a schematic detailed structural view of the display panel provided by an embodiment according to the present invention.

Furthermore, with reference to FIG. 4, FIG. 4 is a schematic detailed structural view of the display panel 10 provided by an embodiment according to the present invention. With reference to FIG. 4, a detection unit 14 and a detection resistor R are also disposed on the driver circuit 12. A power supply unit 15 is disposed in the grayscale output module 13. The display panel 10 further comprises a power board 16.

The power board 16 is electrically connected to a power source connection terminal V in the driver circuit 12 and is configured to supply power to the driver circuit 12. The detection resistor R is electrically connected between the power board 16 and the power source connection terminal V.

The detection unit 14 is electrically connected to two ends of the detection resistor R. The detection unit 14 determines a current driving current according to a resistance value of the detection resistor R and a voltage of two ends of the detection resistor R. When detecting the current driving current exceeding the predetermined current value, the detection unit 14 outputs a warning signal to the grayscale output module 13 such that the grayscale output module 13 determines the sum of the time lengths of the warning signal appearing in the frame time as the above duration.

The power supply unit 15 in the grayscale output module 13 is configured to supply power to the detection unit 14, and an exemplary voltage supplied by the power supply unit 15 to the detection unit 14 is 3V. Furthermore, after the frame time ends, the grayscale output module 13 also outputs the reset signal to the detection unit 14 such that the detection unit 14 stops outputting the warning signal.

It is easily understood that in the present embodiment, when the above current driving current does not exceed the predetermined current value, the detection unit 14 outputs a high level shut-off signal. When the above current driving current exceeds the predetermined current value, the high level shut-off signal output by the detection unit 14 jumps to a low level warning signal. In other embodiment formed from the present invention, the warning signal can also be a high level signal. Namely, in the variant, the shut-off signal is a low level signal.

It should be explained that generally, a frame would be divided into several sub-fields with equal time lengths, the above warning signal can appear continuously in the adjacent sub-fields, and can also appear intermittently in the sub-fields not adjacent to each other. By calculating a sum of the sub-fields where the warning signal appears, the duration can be acquired. Besides, in some possible variants, a frame is also divided into several sub-fields with unequal time lengths. At this time, because weights of times occupied by the sub-fields occupying in a frame are unequal, performing a weighted calculation according to a predetermined formula is required to acquire the duration when the sum of the sub-fields where the warning signal appears.

Furthermore, the method of acquiring the above duration can also be that the grayscale output module 13 records times respectively when the above current driving current exceeds the predetermined current value and when the above current driving current decreases to be lower than the predetermined current value, and finally a duration is calculated by calculating a difference between the times. Besides, the grayscale output module 13 can also use all remaining time of the current frame as a duration after the above current driving current exceeds the predetermined current value.

Furthermore, in the present embodiment, a number of the driver circuit 12 is one. In other variants formed by the present invention, a number of the driver circuit 12 can be plural, electrical connection is between different ones of the driver circuits 12, and the power board 16 provides the driver circuits 12 with a voltage required for driving the backlight unit 11. An exemplary voltage required for driving the corresponding backlight unit 11 provided by the power board 16 to the driver circuits 12 is 30V.

Distinguished from the conventional technologies, the present invention provides a display panel 10 comprising a backlight unit 11, a driver circuit 12 electrically connected to the backlight unit 11 and configured to drive the backlight unit 11, and a grayscale output module 13 electrically connected to the driver circuit 12 and configured to determine providing the driver circuit 12 with a target grayscale value for driving the backlight unit 11 to light according to a duration of the current driving current output to the backlight unit 11 exceeding the predetermined current value. The grayscale output module 13 in the display panel 10 provided by the present invention would adjust the grayscale value in the backlight unit 11 as a target grayscale value according to the duration of the current driving current in the current frame of the backlight unit 11 exceeding predetermined current value to adjust a driving current of the backlight unit 11 lighting in the next frame, which effectively prevents the working power of the backlight unit 11 from exceeding specification.

Figure 5:
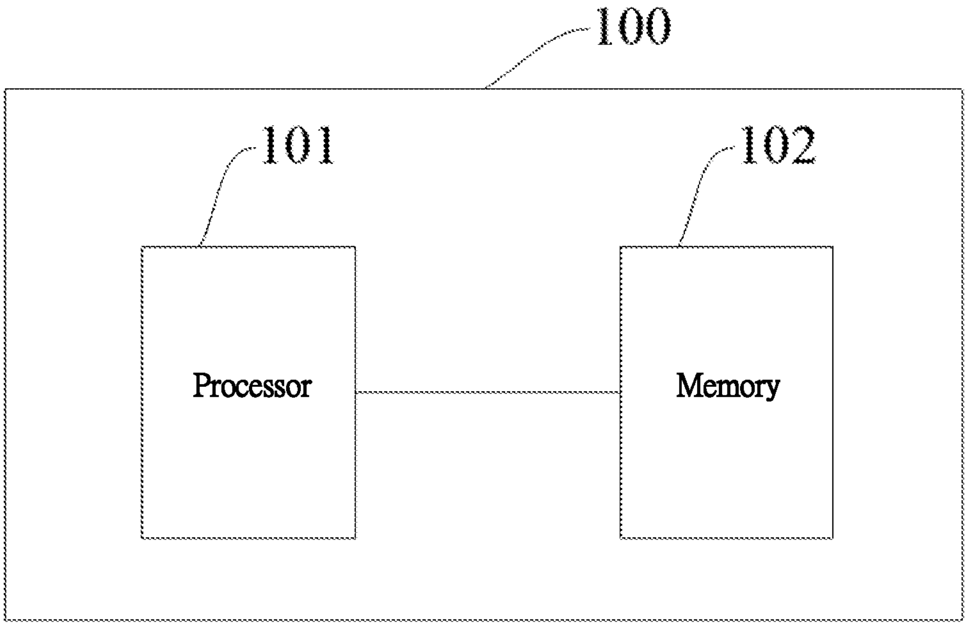
FIG. 5 is a schematic structural view of a mobile terminal provided by an embodiment according to the present invention.

With reference to FIG. 5, FIG. 5 is a schematic structural view of a mobile terminal provided by an embodiment according to the present invention. The above display panel 10 is applied to the mobile terminal, and the mobile terminal can be an intelligent cell phone or tablet. From the figure, it is very intuitive to see various components of the present invention and a relative positional relationship of each component.

With reference to FIG. 5, the mobile terminal 100 comprises a processor 101 and a memory 102. The processor 101 is electrically connected to the memory 102.

The processor 101 is a control center of the mobile terminal 100. It uses various interfaces and lines to connect each component of the entire mobile terminal, and performs various functions and processes the data of the mobile terminal 100 by implementing or executing software programs and/or modules stored in the memory 102, and calling data stored in the memory 102, so as to monitor the mobile terminal overall.

Figure 6:
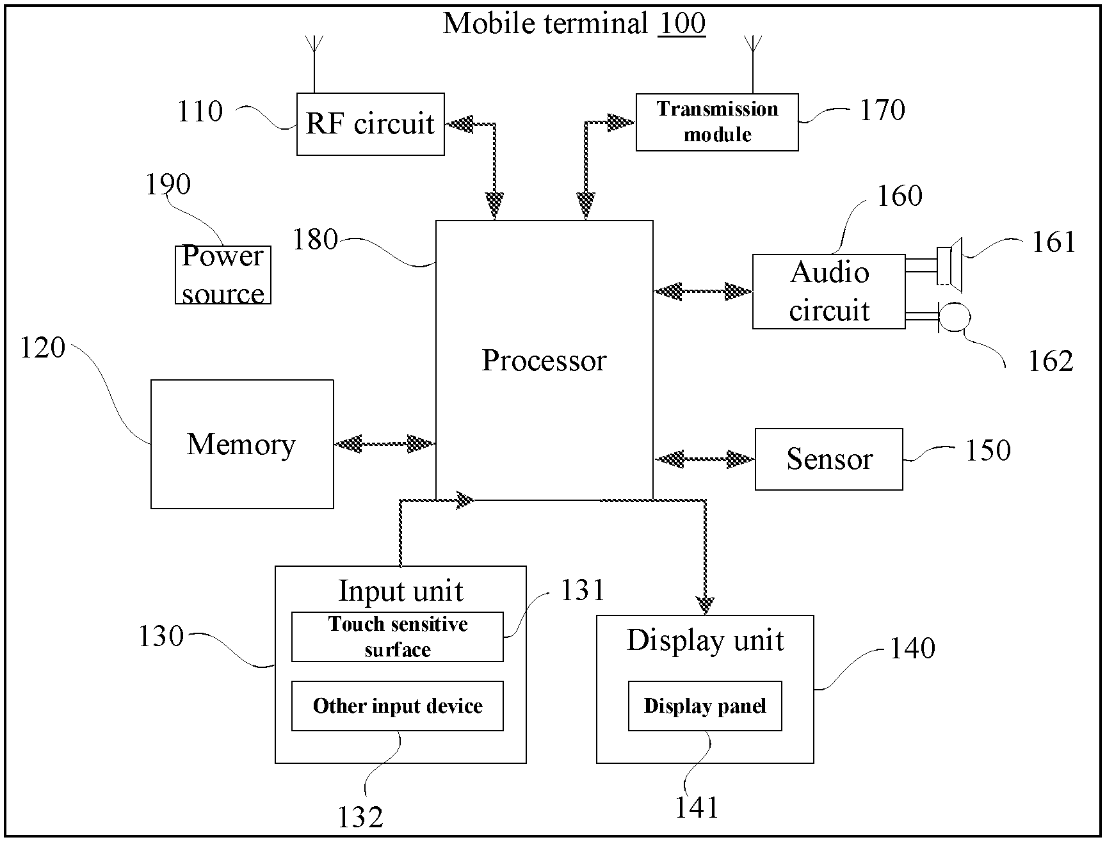
FIG. 6 is a schematic detailed structural view of the mobile terminal provided by an embodiment according to the present invention.

With reference to FIG. 6, FIG. 6 is a schematic detailed structural view of the mobile terminal provided by an embodiment according to the present invention. The mobile terminal can be an intelligent cell phone, a tablet, etc. From the figure, it is very intuitive to see various components of the present invention and a relative positional relationship of each component.

FIG. 6 illustrates a specific structural frame view of the mobile terminal 100 provided by the present invention embodiment. As shown in FIG. 6, the mobile terminal 100 can comprise a radio frequency (RF) circuit 110, comprising one or more components of memory 120 of computer readable storage medium, input unit 130, display unit 140, sensor 150, audio circuit 160, and transmission module 170 (for example, wireless fidelity (WiFi)), and comprises components such as processor 180 of one or more process cores, power source 190, etc. A person of ordinary skill in the art can understand that a structure of the mobile terminal shown in FIG. 6 does not constitute a limit to the mobile terminal and can comprise components more or less than those shown in the figures, or combine some components, or different arrangements of components.

The RF circuit 110 is configured to receive and transmit electromagnetic waves, and achieve mutual conversion between the electromagnetic waves and electrical signals to have communication with a communication internet or other devices. The RF circuit 110 can comprise various conventional circuit assemblies for implementing these functions, for example, antenna, RF trans-receiver digital signal processor, encryption/decryption chip, subscriber identity module (SIM) card, memory, etc. The RF circuit 110 can be in communication with various internets such as internet, corporate intranet, wireless internet, or be in communication with other devices through a wireless internet. The above wireless internet can comprise honeycomb phone network, wireless local area network or metropolitan area network. The above wireless internet can employ various communication standards, protocols, and technologies comprising but not limited to global system for mobile communication (GSM), enhanced data GSM environment (EDGE), wideband code division multiple access (WCDMA), code division access (CDMA), time division multiple access (TDMA), wireless fidelity (Wi-Fi) (for example, Institute of Electrical and Electronics Engineers (IEEE) 802.11a, IEEE 802.11b, IEEE802.11g and/or IEEE 802.11n), voice over internet protocol (VoIP), worldwide interoperability for microwave access (Wi-Max), other protocols for mails, instant messaging, and short messages, and other suitable communication protocols, and even can comprise protocols not developed yet at present.

The memory 120 can be configured to store a software program and a module such as a corresponding program instruction in the above audio amplifier control method. The processor 180 implements the software program and module stored in the memory 120 to implement various function applications and data process, which achieves a frequency transmitted by the mobile terminal 100 to generate a function such as interfering signal. The memory 120 can comprise a high speed random memory, and can also comprise a non-volatile memory such as a plurality of magnetic storage device, flash ram, or other non-volatile solid state memory. In some embodiments, the memory 120 can further comprise memories remotely disposed relative to the processor 180. These remote memories can be connected to the mobile terminal 100 through an internet. The above embodiment of the internet comprises but is not limited to internet, corporate intranet, local area network, mobile communication network and their combination.

The input unit 130 can be configured to receive input digital or character messages, and generate signal input of keyboard, mouse, trackball, mouse, or joystick relative to user configuration and function control. Specifically, the input unit 130 can comprise a touch sensitive surface 131 and other input device 132. The touch sensitive surface 131, so-called touch display screen or touch panel, can collect a user's touch operation (for example, the user uses a suitable object or accessory such as finger, touch pen, etc. to operate on the touch sensitive surface 131 or near the touch sensitive surface 131) on or near the touch sensitive surface 131, and drive a corresponding connection device according to a preset program. Optionally, the touch sensitive surface 131 can comprise two components that are a touch detection device and a touch controller. The touch detection device detects the user's touch location and detects a signal brought by the touch operation, and sends the signal to the touch controller. The touch controller receives the touch signal from the touch detection device, converts it into a touch coordinate, and sends it to the processor 180, and the touch controller can receive and implement instructions transmitted from the processor 180. Furthermore, resistor type, capacitor type, infrared type, and surface acoustic wave type can be utilized to achieve the touch sensitive surface 131. Besides the touch sensitive surface 131, the input unit 130 can also comprise other input device 132. Specifically, other input device 132 can comprise but is not limited to one or more of physical keyboard, function key (for example, volume control key, switch key, etc.), trackball, mouse, joystick, etc.

The display unit 140 can be configured to display messages input by a user or messages provided to user and various graphic user ports of the mobile terminal 100. These graphic user ports are formed by graphics, texts, icons, videos, and combination thereof. The display unit 140 can comprise a display panel 141, Optionally, the display panel 141 can be configured in form of liquid crystal display (LCD), organic light emitting diode (OLED), etc. Furthermore, the touch sensitive surface 131 can cover the display panel 141. When the touch sensitive surface 131 detects a touch operation on or near the touch sensitive surface 131, a signal is sent to the processor 180 to determine a type of a touch event, and then the processor 180 provides the display panel 141 with visual output according to the type of the touch event. Although in the figure, the touch sensitive surface 131 and the display panel 141 serve as two individual components for achieving input and output functions, in some embodiments, the touch sensitive surface 131 and the display panel 141 can be integrated to achieve input and output functions.

The mobile terminal 100 can further comprise at least one sensor 150, for example, optical sensor, motion sensor, and other sensor. Specifically, optical sensor can comprise an ambient light sensor and a proximity sensor. The ambient light sensor can adjust brightness of the display panel 141 according to brightness of ambient light, and the proximity sensor can generate an Interrupt when a flip cover is shut up or closed. As one of motion sensors, a gravity acceleration sensor can detect a value of an acceleration in each direction (generally three axes), and when static it can detect a value and direction of the gravity, and can be configured for applications of recognizing postures of the cell phone (for example, horizontal-vertical screen switch, relative games, magnetometer posture calibration), vibration recognition relative functions (for example, pedometer, knocks), etc. Other sensors such as gyroscope, barometer, hygrometer, thermometer, infrared sensor, etc. that can be deployed on the mobile terminal 100 are not described repeatedly here.

The audio circuit 160, a speaker 161, and a microphone 162 can provide audio interfaces between the user and the mobile terminal 100. The audio circuit 160 can transmit an electrical signal converted from received audio data to the speaker 161 such that the speaker 161 converts the electrical signal into a sound signal and outputs the sound signal. On the other hand, the microphone 162 converts the collected sound signal into an electrical signal, the electrical signal received by the audio circuit 160 received is converted into audio data, and the audio data is output to and processed by the processor 180 and is transmitted through the RF circuit 110 to another terminal, for example; or the audio data is output the memory 120 for further processing. The audio circuit 160 may comprise an ear socket to provide communication between an earphone and the mobile terminal 100.

The mobile terminal 100 can help a user to receive a request through the transmission module 170 (for example, Wi-Fi module), send messages, etc., and it provides user with wireless broadband internet access. Although the transmission module 170 is shown in the figure, understandably it is not a necessary component of the mobile terminal 100 and can be omitted without changing nature of the invention.

The processor 180 is a control center of the mobile terminal 100. It uses various interfaces and lines to connect each component of the entire cell phone, and performs various functions and processes the data of the mobile terminal 100 by implementing or executing software programs and/or modules stored in the memory 120, and calling data stored in the memory 120, so as to monitor the mobile terminal overall. Optionally, the processor 180 can comprise one or a plurality of process cores. In some embodiments, the processor 180 can be integrated with an application processor and a modem processor. The application processor mainly processes and operates systems, user interfaces, application program, etc. The modem processor mainly processes wireless communication. It can be understood that the above modem processor can also be not integrated into the processor 180.

The mobile terminal 100 further comprises a power source 190 (for example, battery) for supplying power to each component. In some embodiments, the power source can be logically connected to the processor 180 through a power source management system to further achieve management functions such as charging management, discharging management, power consumption management, etc. through the power source management system. The power source 190 can also comprise one or more assemblies such as DC or AC power source, recharge system, power source malfunction detection circuit, power source converter or inverter, a power source state indicator, etc.

Despite not shown, the mobile terminal 100 further comprises a camera (for example, front camera, rear camera, etc.), a bluetooth module, a flashlight, etc., which is not described repeatedly here. Specifically, in the present embodiment, the display unit of the mobile terminal 100 is a touch screen display.

In addition to the foregoing embodiments, the present invention may also have other embodiments. All technical solutions formed by equal replacement or equivalent replacement fall within the scope of protection required by the present invention.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. A grayscale controlling method, applied to a display panel including a backlight unit, and the grayscale controlling method comprising:

in a frame time, acquiring a duration of a current driving current output to the backlight unit exceeding a predetermined current value; and adjusting a grayscale value of the backlight unit as a target grayscale value according to the duration;

wherein the step of acquiring the duration of the current driving current output to the backlight unit exceeding the predetermined current value specifically comprises:

outputting a warning signal when the current driving current output to the backlight unit exceeds the predetermined current value; and determining a sum of time lengths of the warning signal appearing in the frame time as the duration of the current driving current exceeding the predetermined current value.

2. The grayscale controlling method according to claim 1, wherein the frame time comprises a plurality of sub-fields, the warning signal appears in adjacent ones of the sub-fields, and/or the warning signal appears in non-adjacent ones of the sub-fields.

3. The grayscale controlling method according to claim 2, wherein time lengths of the sub-fields are equal, and/or the time lengths of the sub-fields are unequal.

4. The grayscale controlling method according to claim 3, wherein when the time lengths of the sub-fields are unequal, the step of determining the sum of the time lengths of the warning signal appearing in the frame time as the duration of the current driving current exceeding the predetermined current value specifically comprises:

determining the sub-fields of the warning signal appearing in the frame time as target sub-fields; and performing a weighted calculation according to a predetermined formula and time lengths of the target sub-fields to determine the duration of the current driving current exceeding the predetermined current value.

5. The grayscale controlling method according to claim 1, wherein the step of adjusting the grayscale value of the backlight unit as the target grayscale value according to the duration specifically comprises:

acquiring a grayscale value look-up table when the duration exceeds a predetermined time, wherein the grayscale value look-up table comprises a plurality of calibration durations and a plurality of grayscale value mapping messages; and determining the grayscale value corresponding to the duration as the target grayscale value according to the grayscale value look-up table.

6. The grayscale controlling method according to claim 1, wherein after the step of adjusting the grayscale value of the backlight unit as the target grayscale value according to the duration, the method further comprises:

determining a target driving current output to the backlight unit according to the target grayscale value.

7. The grayscale controlling method according to claim 6, wherein after the step of determining the target driving current output to the backlight unit according to the target grayscale value, the method further comprises:

outputting a reset signal; and returning to and implementing the step of in the frame time, acquiring the duration of the current driving current output to the backlight unit exceeding the predetermined current value according to the reset signal.

8. A display panel, wherein the display panel comprises:

a backlight unit;

at least one driver circuit electrically connected to the backlight unit and configured to drive the backlight unit; and a grayscale output module electrically connected to the driver circuit and configured to determine a target grayscale value provided to the driver circuit, wherein the target grayscale value is required for driving the backlight unit to light according to a duration of a current driving current output to the backlight unit exceeding a predetermined current value;

wherein the display panel further comprises a detection unit, and the detection unit is configured to output a warning signal to the grayscale output module when the current driving current exceeds the predetermined current value such that the grayscale output module determines a sum of time lengths of the warning signal appearing in a frame time as the duration.

9. The display panel according to claim 8, wherein the frame time comprises a plurality of sub-fields, the warning signal appears in adjacent ones of the sub-fields, and/or the warning signal appears in non-adjacent ones of the sub-fields.

10. The display panel according to claim 9, wherein time lengths of the sub-fields are equal, and/or the time lengths of the sub-fields are unequal.

11. The display panel according to claim 10, wherein when the time lengths of the sub-fields are unequal, the detection unit is configured to determine the sub-fields of the warning signal appearing in the frame time as target sub-fields and implement a weighted calculation according to a predetermined formula and time lengths of the target sub-fields to determine the duration of the current driving current exceeding the predetermined current value.

12. The display panel according to claim 8, wherein the grayscale output module is further configured to output a reset signal to the detection unit after the frame time ends such that the detection unit stops outputting the warning signal.

13. The display panel according to claim 8, wherein a detection resistor is disposed on the driver circuit, the detection unit is electrically connected to two ends of the detection resistor, and the detection unit determines the current driving current according to a resistance value of the detection resistor and voltages at the two ends of the detection resistor.

14. The display panel according to claim 8, wherein the grayscale output module further comprises a power supply unit, and the power supply unit is configured to supply power to the detection unit.

15. A mobile terminal, wherein the mobile terminal comprises a display panel, and the display panel comprises:

a backlight unit;

at least one driver circuit electrically connected to the backlight unit and configured to drive the backlight unit; and a grayscale output module electrically connected to the driver circuit and configured to determine a target grayscale value provided to the driver circuit, wherein the target grayscale value is required for driving the backlight unit to light according to a duration of a current driving current output to the backlight unit exceeding a predetermined current value;

wherein the display panel further comprises a detection unit, and the detection unit is configured to output a warning signal to the grayscale output module when the current driving current exceeds the predetermined current value such that the grayscale output module determines a sum of time lengths of the warning signal appearing in a frame time as the duration.

16. The mobile terminal according to claim 15, wherein the frame time comprises a plurality of sub-fields, the warning signal appears in adjacent ones of the sub-fields, and/or the warning signal appears in non-adjacent ones of the sub-fields.

17. The mobile terminal according to claim 16, wherein time lengths of the sub-fields are equal, and/or the time lengths of the sub-fields are unequal.

* * * * *